Sept. 29, 1970  H. BECK  3,531,621
PUNCH FOR HOT-SEALING FOILS FOR WRAPPINGS
Filed Aug. 14, 1968  2 Sheets-Sheet 1
Fig. 1
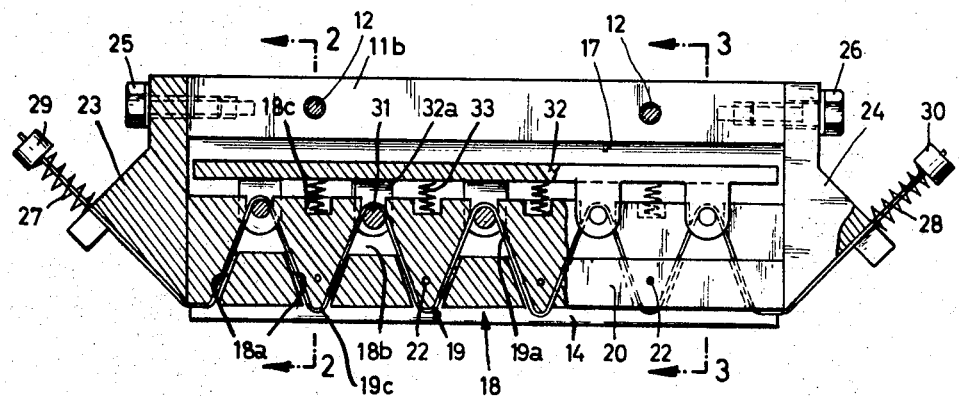
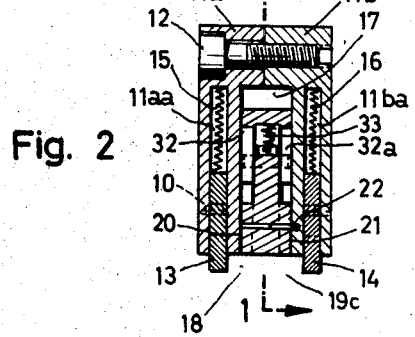
Fig. 2
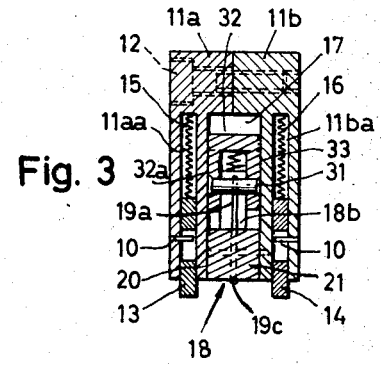
Fig. 3
Fig. 4
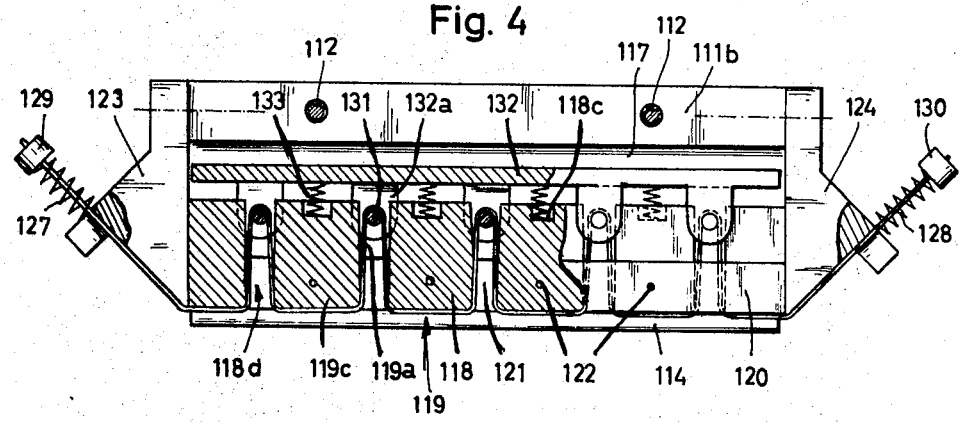
Inventor:
Hans Beck
By
Walter Becker Sept. 29, 1970            H. BECK            3,531,621

PUNCH FOR HOT-SEALING FOILS FOR WRAPPINGS

Filed Aug. 14, 1968            2 Sheets-Sheet 2

Inventor:
Hans Beck

United States Patent Office 3,531,621
Patented Sept. 29, 1970

3,531,621
PUNCH FOR HOT-SEALING FOILS FOR WRAPPINGS
Hans Beck, 27 Urbanstrasse, 7440 Nurtingen, Germany
Filed Aug. 14, 1968, Ser. No. 752,634
Claims priority, application Germany, Aug. 16, 1967,
B 93,991
Int. Cl. B30b 15/34; B32b 31/20; H05b 3/02
U.S. Cl. 219—243                                 5 Claims

ABSTRACT OF THE DISCLOSURE

A welding ram, especially for use in connection with a wrapping machine having means for hot sealing two foils to each other to produce a wrapping envelope, which includes longitudinally extending frame means, a rail member extending in the longitudinal direction of and mounted in said frame means and having one longitudinal edge surface exposed to the outside thereof, said rail member being provided with passage means extending from said one longitudinal edge surface in the direction toward the opposite side thereof in the interior of said frame means, supporting means associated with said passage means and located within said frame means, and a heating wire adapted to be connected to a source of electric current and while extending in the longitudinal direction of said rail member alternately passing over sections of said one longitudinal edge surface and said supporting means through said passage means.

---

Non-air-tight sealed wrapping envelopes produced by the aid of interrupted welding seams are desired for many goods and applications. The present invention relates to a welding ram for hot-sealing foils to produce wrappers, and more specifically concerns a welding ram which comprises a welding rail and a heating wire which is mounted on said rail and provided with a cover of synthetic material while acting as welding element.

It is an object of this invention to provide a welding ram of the above mentioned character which may also be employed for producing interrupted welding seams.

It has been found according to the present invention that a welding ram with a heating wire mounted on and extending over the welding ram offers the possibility of solving the problem outlined above in a particularly simple manner inasmuch as according to the invention the heating wire for producing interrupted seams at the interrupted areas forms a loop which extends into a cavity of the rail and is looped over a deviating member therein.

In order to assure the tensioning force necessary with the deviated heating wire for a taut tensioning thereof, the invention provides in a further development thereof that the deviating members are engaged by tensioning elements adapted to accumulate a tensioning force and acting in tensioning direction.

This arrangement may be modified for appropriate areas and in such a way that a plurality of deviating members are provided on a common rail which is acted upon at least by one tensioning element of the above mentioned type so as to tension the loops.

The invention is illustrated by way of example in the accompanying drawing, in which:

FIG. 1 illustrates partially in longitudinal section a side view of a ram according to the invention, said section being taken along the line 1—1 of FIG. 2.

FIG. 2 is a cross-section taken along the line 2—2 of FIG. 1.

FIG. 3 is a cross-section taken along the line 3—3 of FIG. 1.

FIG. 4 illustrates partially in section a side view of a further embodiment of the invention illustrated similar to that of FIG. 1.

Figure 5:
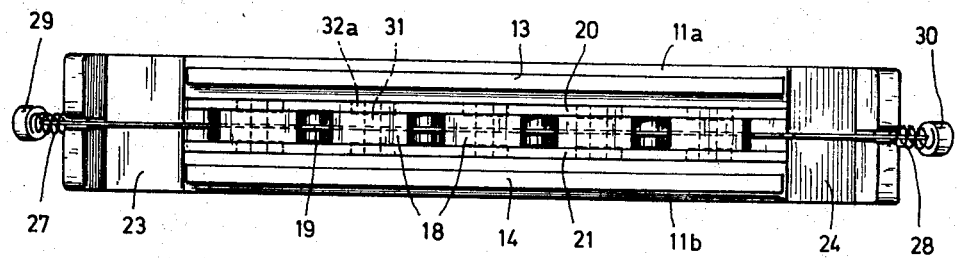
FIG. 5 is a bottom view of the ram in FIG. 1.

Referring now to the drawing in detail, the welding rams shown therein and henceforth merely called rams which are adapted to produce seams which may be torn open may also act as separating welding rams. According to FIGS. 1–3, the ram comprises two sections 11a and 11b which are connected to each other by bolts 12 and represent the main part of the ram. These two sections 11a and 11b are tensioned or braced with regard to each other by the bolts 12. Each of the two sections 11a and 11b has a slot 11aa and 11ba respectively which has been machined into the respective section from the bottom side. Guided in said slots 11aa and 11ba are holding-down rails 13 and 14 respectively which by pressure springs 15 and 16 are continuously urged to occupy an end position which is determined by abutment bolts 10 extending into said slots 11aa and 11ba. These holding-down rails are adopted during the welding operation to recede into the slots.

The ram according to the present invention furthermore comprises a wide and deep slot 17 which is defined by the two sections 11a and 11b. Inserted into said slot 17 is a welding rail 18 which is made of heat storing and electrically conductive material. The welding element proper in the form of a heating wire 19 is tensioned against the lower end face of said welding rail 18. The said heating wire 19 in its turn is provided with a cover which consists of a synthetic material which will prevent the cover from sticking to the respective foils to be fused.

The lower end of the welding rail 18 is provided with lateral strips 20 and 21 which fill in the remaining portion of the width of slot 17. The welding rail 18 together with strips 20 and 21 is held in said slot 17 by means of safety pins 22.

The heating wire 19 is extended and tensioned over the lower end face of the welding rail 18 and has its ends in engagement with the bottom side of supportnig members 23 and 24. These members 23 and 24 are by means of screws 25 and 26 screwed onto the end faces of the main part of the welding ram. One end of a pressure spring 27, 28 rests against said supporting members 23 and 24 whereas the other end of said spring presses under preload against a nipple 29, 30 provided at the end of the heating wire 19, whereby the wire is kept under tension.

According to the embodiment illustrated in FIGS. 1–3, the welding rail 18 is at certain distances provided with inclined bores 18a and furthermore has hollow chambers 18b arranged in spaced relationship to the bottom edge of rail 18. These bores 18a and chambers 18b are passed through by loops 19a of the heating wire 19 while being looped over deviating members 31. The said bolt-shaped deviating members 31 extend into bearing eyes 32a which are downwardly directed and pertain to a rail 32 which is guided above the welding rail 18 in the slot 17. Rail 32 rests in its turn on pressure springs 33 which are inserted in cup-shaped depressions at the top side of the welding rail 18. The pressure springs 33 are under such a preload that the rail 32 together with the bearing eyes 32a and the deviating members 31 therein is urged upwardly by said springs 33 thereby also bringing about the necessary tightening of the heating wire 19 by tightening the loops 19a passing over said deviating members.

The embodiment of FIG. 4 differs from that of FIGS. 1–3 primarily in that the recesses provided in the welding rail 118 do not have the shape of bores and chambers thereabove but for each loop comprise a continuous wide passage 118d while that portion of the welding rail 118 which is located between said passages has a plane bottom side of relatively great length.

Otherwise all elements shown in FIG. 4 correspond to those of FIGS. 1–3 and therefore are provided with the same reference numerals as in FIGS. 1–3 with the exception that they are higher than those of FIGS. 1–3 by 100.

Figure 6:
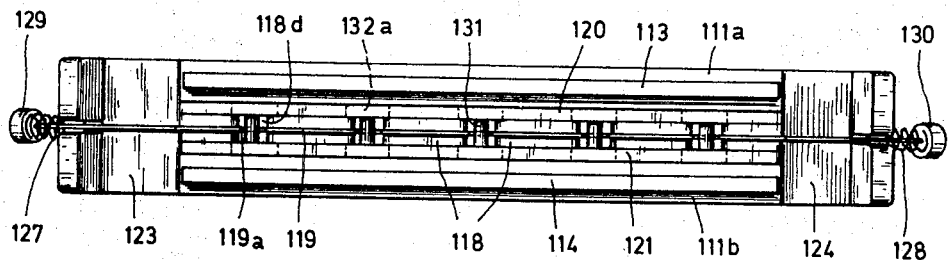
FIG. 6 is a bottom view of the structure in FIG. 4.

A bottom view of the embodiment in FIG. 1 is shown in FIG. 5 and a similar bottom view of the embodiment of FIG. 4 is shown in FIG. 6.

When comparing the embodiments of FIGS. 1–3 on one hand and of FIG. 4 on the other hand with each other, it will be noted that in view of the inclined position of the bores 18a and their mutual spacing, the heating wire 19 is at the bottom side of the welding rail 18 looped solely about the dome of a wedge and acts as welding element only along short curved sections 19c. Within the area of the larger interspaces, the foils treated by the ram remain non-welded or non-fused. Thus, between said foils there will remain slots which alternate with short welded areas.

According to FIG. 4, however, the welding or fusing is effected over longer sections 119c and is interrupted only for short sections so that the welding seam will have longer welded portions with short open non-welded sections.

It is, of course, to be understood that the present invention is, by no means, limited to the particular constructions shown in the drawing but also permits modifications, the invention being determined by the scope of the disclosure.

It is also to be understood that while any heat storing and electrically non-conductive material may be used for the welding rail 18, material such as a heat resistable cured thermosetting plastic has been found highly suitable for this purpose.

Furthermore, as indicated in the foregoing specification, the heating wire 19 may be provided with a cover of synthetic material. As synthetic material in this connection polyfluorethylene has proved highly successful.

What I claim is:

1. A welding ram especially for use in connection with a wrapping machine having means for hot sealing two foils to each other to produce a wrapping envelope, which includes: longitudinally extending frame means, a rail member extending in the longitudinal direction of and mounted in said frame means and having one longitudinal edge surface exposed to the outside thereof, said rail member being provided with passage means extending from said one longitudinal edge surface in the direction toward the opposite side thereof in the interior of said frame means, supporting means associated with said passage means and located within said frame means, a heating wire adapted to be connected to a source of electric current and while extending in the longitudinal direction of said rail member alternately passing over sections of said one longitudinal edge surface and said supporting means through said passage means, said supporting means being movable in a direction toward and away from said one longitudinal edge surface, and yieldable spring means continuously urging said supporting means away from said one longitudinal edge surface for maintaining said heating wire passed over said supporting means under tension.

2. A welding ram according to claim 1, in which said supporting means are formed by pin means having their axes transverse to the longitudinal direction of said rail member and substantially parallel to the said one edge surface thereof.

3. A welding ram according to claim 1, in which said heating wire is provided with a cover of synthetic material.

4. A welding ram, especially for use in connection with a wrapping machine having means for hot sealing two foils to each other to produce a wrapping envelope, which includes: longitudinally extending frame means, a rail member extending in the longitudinal direction of and mounted in said frame means and having one longitudinal edge surface exposed to the outside thereof, said rail member being provided with passage means extending from said one longitudinal edge surface in the direction toward the opposite side thereof in the interior of said frame means, supporting means associated with said passage means and located within said frame means, a heating wire adapted to be connected to a source of electric current and while extending in the longitudinal direction of said rail member alternately passing over sections of said one longitudinal edge surface and said supporting means through said passage means, an auxiliary rail member common to and supporting a plurality of supporting means, said auxiliary rail member being movable toward and away from said one longitudinal edge surface, and yieldable spring means continuously urging said auxiliary rail member and thereby said supporting means in a direction away from said one longitudinal edge surface.

5. A welding ram, especially for use in connection with a wrapping machine having means for hot sealing two foils to each other to produce a wrapping envelope, which includes: longitudinally extending frame means, a rail member extending in the longitudinal direction of and mounted in said frame means and having one longitudinal edge surface exposed to the outside thereof, said rail member being provided with passage means extending from said one longitudinal edge surface in the direction toward the opposite side thereof in the interior of said frame means, supporting means associated with said passage means and located within said frame means, a heating wire adapted to be connected to a source of electric current and while extending in the longitudinal direction of said rail member alternately passing over sections of said one longitudinal edge surface and said supporting means through said passage means, and yieldable spring means arranged on the outside of said frame means and continuously exerting a pull on said heating wire in opposite directions.

References Cited
UNITED STATES PATENTS

| | | | |
|---|---|---|---|
| 2,835,776 | 5/1955 | Blessing | 219—10.53 |
| 3,015,601 | 1/1962 | Fener | 156—583 |
| 3,253,122 | 5/1966 | Kochmer et al. | 338—316 |
| 3,271,560 | 9/1966 | Schott | 219—243 |

ANTHONY BARTIS, Primary Examiner

P. W. GOWDEY, Assistant Examiner

U.S. Cl. X.R.

156—583; 219—233; 338—290